Figure 1:
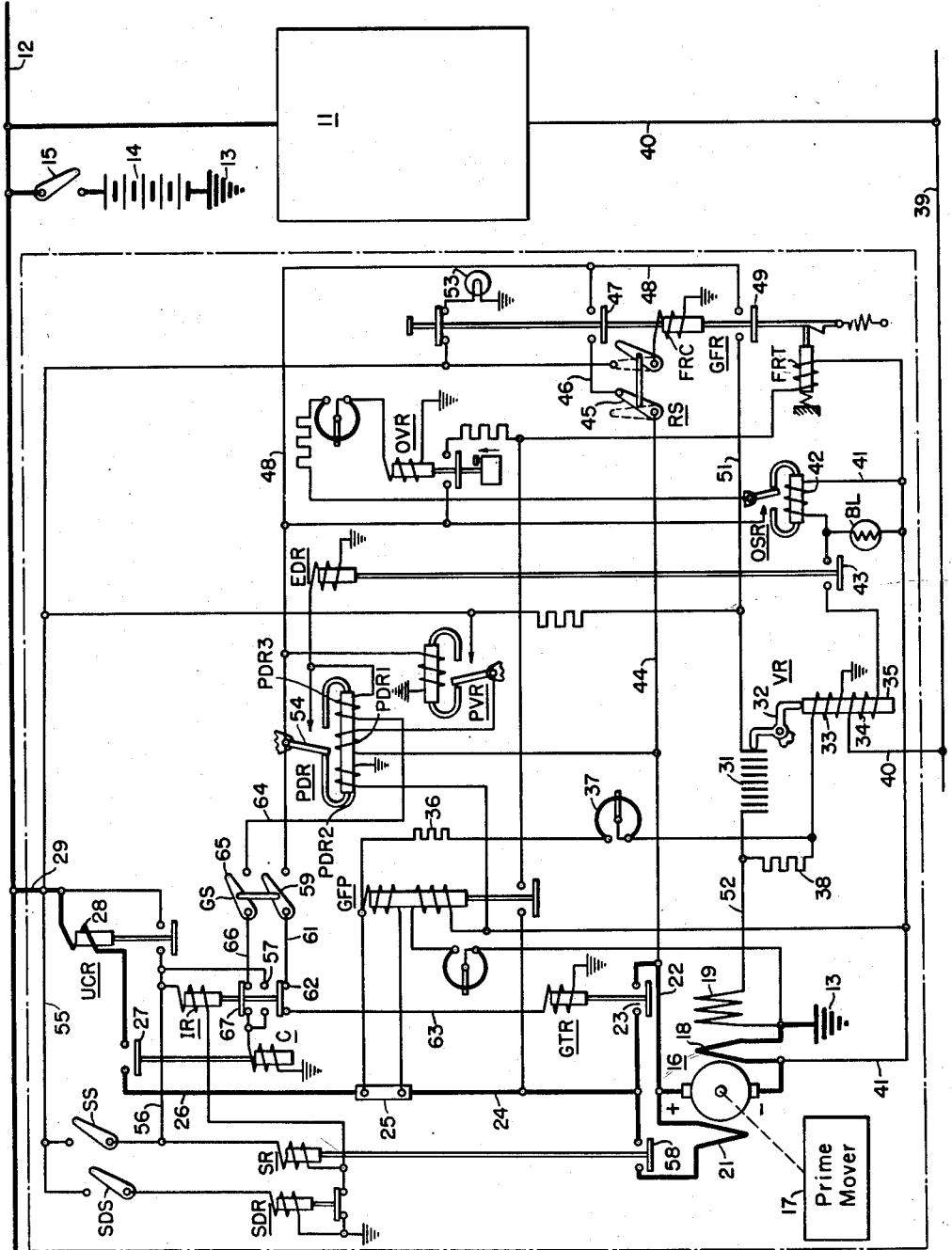

INVENTORS
Bascum O. Austin, Ralph D. Jessee
and Clare A. Stump, Jr.

Patented Jan. 19, 1954

2,666,872

UNITED STATES PATENT OFFICE 2,666,872

ELECTRIC POWER SYSTEM FOR AIRCRAFT

Bascum O. Austin, Ralph D. Jessee and Clare A. Stump, Jr., Lima, Ohio, assignors to Westinghouse Electric Corporation, East Pittsburgh, Pa., a corporation of Pennsylvania Application August 19, 1950, Serial No. 180,424

12 Claims. (Cl. 317—13)

Our invention relates, generally, to auxiliary electric power systems for aircraft and the like employing a plurality of direct current generators driven by prime movers or engines for supplying power to a common load bus and, more particularly, to a control and protective system for such power systems and generators wherein provision is made for employing the generators as starting motors for their associated prime movers or engines.

An object of our invention, generally stated, is to provide a control and protective system for aircraft generators and generator systems which shall be of simple and economical construction and which is safe and reliable in operation.

A more specific object of our invention is to provide, in a system of the character described, for employing the direct current machines, which normally function as generators, as starting motors for their associated prime movers or engines and effecting this operation with a minimum amount of apparatus.

A further object of our invention is to provide for employing the direct current machines as starting motors for their associated prime movers and controlling the connection of these machines in their dual capacities by means of only three contactors or line switches which are operated in different combinations to effect the desired results.

Another object of our invention is to provide for rendering one combination of line contactors associated with each machine operable to so connect the machine to the load bus as to effect a cranking operation in response to a momentary operation of a manual starting switch and to automatically disconnect the machine from the load bus in response to the starting of the engine.

A still further object of our invention is to provide for employing three line contactors for controlling the connection of each direct current machine to the load bus and effecting the closing of two of said contactors by manual control to connect each machine to the load bus as a starting motor for its prime mover or engine while maintaining the other contactor inoperative, automatically effecting the operation of said two contactors in response to a predetermined reduction in the amount of starting current drawn by the machine and thereafter effecting the closure of one of said contactors and a third contactor, while maintaining the other of said two contactors inoperative, to connect the machines to the load bus as generators, each in response to a manual initiating operation and the attainment of predetermined polarity and voltage conditions of the generators.

Another object of our invention is to provide for normally maintaining a predetermined load division between the machines when more than one is connected to the load bus by means of an interconnected voltage regulator system and for automatically disconnecting any of the machines from the load bus in response to occurrence of any one of a number of different kinds of faults in the machine, the machine leads or feeder cables that connect the machines to the load bus and the control system itself.

A further object of our invention is to provide for selecting and disconnecting from the system a generator which is producing abnormally high voltage, while leaving the normal generators connected to the system.

Other objects of our invention will be explained fully hereinafter or will be apparent to those skilled in the art.

In practicing our invention in its preferred form, each of the several direct current machines is connected in driving relation with its prime mover or engine, and they are arranged to be connected individually or in parallel relation between ground and the load bus, to which a storage battery is also usually connected, either as starting or cranking motors for their respective engines or as generators to supply power to the bus.

Each machine is provided with a starting or motor winding in addition to the usual series and shunt field windings, and is connected for operation by a plurality of electrically operated line contactors or switches of which there are three, in this instance referred to as main, starting and transfer contactors. The control circuit arrangement, individual to each machine as well as common to all, is such that any machine may be connected as a starting or cranking motor for its engine in response to the closure of its manual starting switch which effects closure of the main and starting contactors to connect the machine to the load bus and ground through its starting and series field windings only while maintaining the transfer contactor open. When the engine starts, the load current of the starting motor is reduced, and this effects the operation of a relay which opens the main and starting contactors so that the machine is made ready to be connected as a generator.

Each running machine may be connected as a generator by actuating its individual switch which initiates the connecting operation which culminates in the closure of the main and transfer contactors when the magnitude and polarity of the voltage is correct, as determined by the polarized voltage and differential relays associated with each machine.

Each machine is provided with a voltage regulator controlling the excitation of its shunt field winding. The regulators are provided with paralleling windings connected through a common equalizer bus to effect proper load division between the machines operating as generators. Each machine is also provided with an equalizer disconnect relay which functions to disconnect the paralleling winding from the equalizer bus when its associated generator is shut down for any reason.

The shunt field circuits of the machines are controlled by field relays of the latch type which are electrically tripped, and electrically or manually reset. Overvoltage protection of each machine is provided by individual overvoltage relays which trip the field relays. Additional protection is provided by protective relays operable in response to a fault in the machine, the leads or feeders, or the control system to also trip the field relays to remove the machines from the load bus.

Figure 2:
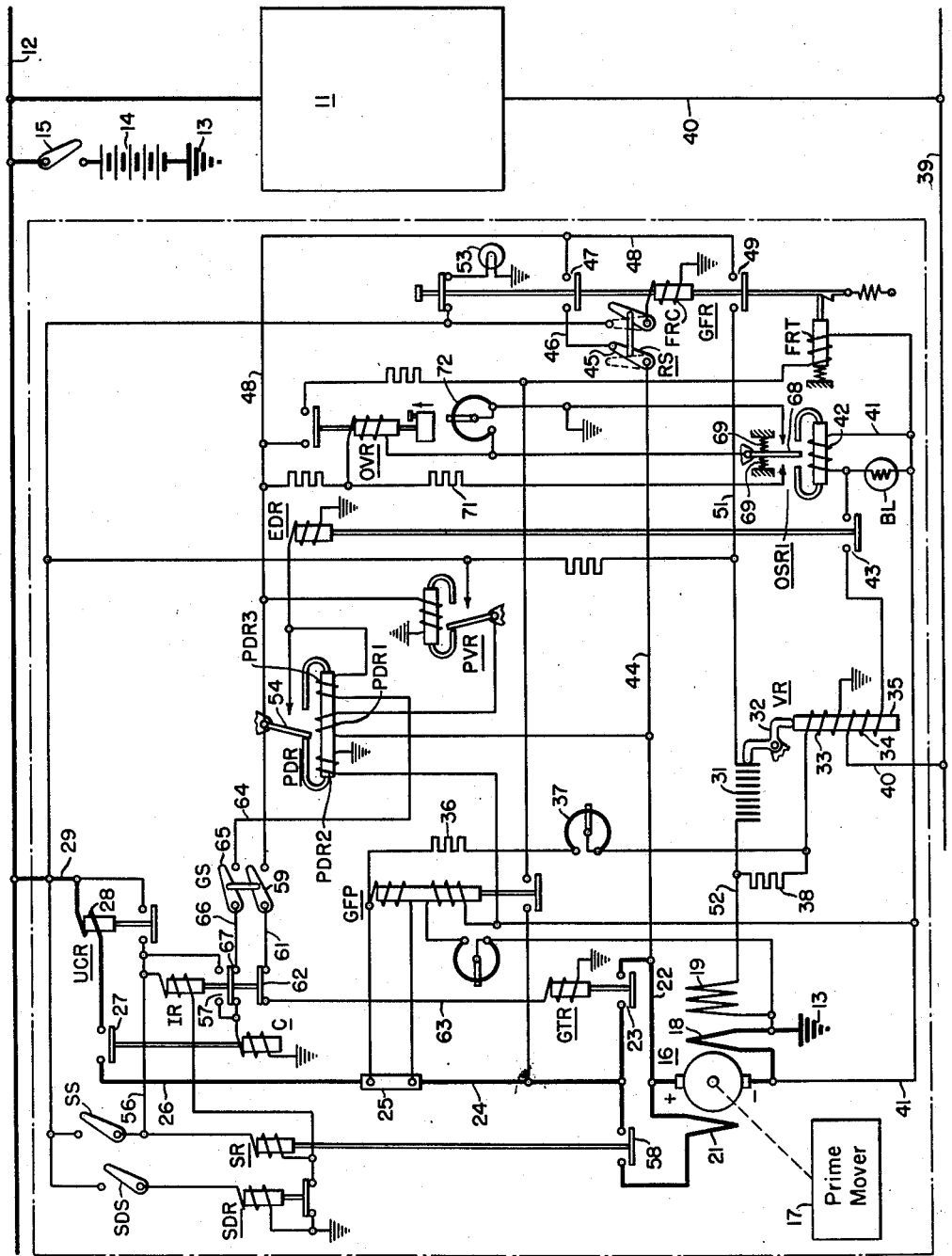

For a better understanding of the nature and objects of our invention, reference may be had to the following detailed description taken in conjunction with the accompanying drawings, in which Figure 1 is a diagrammatic view of a power system embodying the principal features of our invention and Figure 2 is a diagrammatic view of a modification of the invention.

Referring now to the drawings, and particularly to Fig. 1 which shows a multi-unit starting and generating system, there is shown a pair of machine units 10 and 11 disposed to be connected in parallel circuit relation between a load bus 12 of positive potential and ground, illustrated by the usual symbol at 13. The system may also include a storage battery 14 connected to bus and ground by a switch 15.

Since the machine units are substantially identical insofar as the number and arrangement of parts are concerned, only one unit has been illustrated in detail, and this particular unit will be described. Reference will be made to the other unit 11 in a general way in order to describe the system as a whole. The unit 11 is symbolic of any number of additional units.

The unit 10 comprises a direct current machine 16 which is normally used as a generator to supply power to the bus and also as a starting motor for its associated engine or prime mover 17 which is representative of one of the main engines of the airplane and which is not self-starting. The machine 16 is provided with a series field winding 18, a shunt field winding 19, and a starter or motor field winding 21.

The positive terminal or connection of the machine 16 is connected to the bus 12 through a positive lead 22, contact members 23 of a generator transfer relay GTR, a feeder conductor 24, a shunt 25, a feeder conductor 26, contact members 27 of a main contactor C, a series coil 28 of an undercurrent relay UCR and a feeder conductor 29. The negative terminal of the generator is connected to ground 13 through the series field winding 18.

A voltage regulator VR is provided for maintaining a substantially constant generator voltage. The regulator VR controls the energization of the shunt field winding 19 in a manner well known in the art. The regulator comprises a carbon pile or stack 31 which may be compressed by a combined solenoid and lever mechanism 32 having a main coil 33 and a paralleling coil 34 disposed to actuate a solenoid core 35.

As shown, the main coil 33 is connected between the power conductor 26 and ground so as to be responsive to the generator voltage, and a fixed resistor 36 and an adjusting rheostat 37 are connected in series with the coil 33. A stabilizing resistor 38 is also connected in the regulator circuit, as shown.

Proper load division between a plurality of machines operating in parallel is obtained by means of the equalizer or paralleling coil 34 on the regulator. Voltage for the equalizing circuit is obtained from the voltage drop across the generator series winding 18 in the negative lead of the generator. The equalizer coil 34 is connected between the negative terminal of the generator 16 and an equalizer bus 39 through a conductor 41, a coil 42 of an overvoltage selector relay OSR or through a ballast lamp BL, contact members 43 of an equalizer disconnect relay EDR, the equalizer coil 34, and a conductor 40.

The non-linear resistor or ballast lamp BL prevents lowering of the system voltage by the equalizer circuit when the speed of one or more generators is reduced. Under this condition, a high current tends to flow in the equalizer circuit in a direction to lower the voltage of the normal-speed generators, and the ballast lamp BL limits the equalizer current to prevent the lowering of the system voltage which would otherwise occur, as more fully described in a patent to R. J. Lusk, No. 2,494,397, issued January 10, 1950.

The equalizer disconnect relay EDR functions to prevent lowering of the system voltage when one or more of the generators is shut down, or disconnected from the system. Under this condition, the idle generator furnishes no equalizer voltage and the direction of current flow in the equalizer circuit would be such as to lower the voltage of the remaining generators, thus reducing the system voltage. The equalizer disconnect relay EDR disconnects the coil 34 from the equalizer circuit when the generator is shut down and thus prevents this lowering of the system voltage.

The circuit for the shunt field winding 19 extends from the positive conductor 22 through a conductor 44, contact members 45 of a reset switch RS, conductor 46, contact members 47 of a generator field relay GFR, conductor 48, contact members 49 of the relay GFR, conductor 51, the carbon pile resistor 31 of the regulator VR, conductor 52, the shunt field winding 19 and the series field winding 18 to the negative terminal of the generator 16.

It will be understood that all the regulators of the system are so connected to their respective generators and to the common equalizer bus 39 that the main coils of the regulators function to cause the regulators to maintain the desired generator voltage, and the paralleling or equalizer coils cause the regulators to maintain the desired load division between those generators which are connected to the bus.

For maximum assurance of power continuity and safety, a system having a relatively high generating capacity must be protected against faults. Some faults which can occur can be dangerous not only to the electrical system but to the plane itself. A fault, which does not burn clear or is of long duration, can very easily start a fire unless means are provided to prevent it. The present system includes protective means for disconnecting the generator from the system, or preventing its connection to the system, under any of a number of fault or abnormal conditions.

Connection of the generator to the bus is controlled by a polarized voltage relay PVR and a polarized differential relay PDR, which allow the generator to be connected to the bus only if its voltage is of the correct polarity and greater than the system voltage. If the generator should build up with reversed polarity, for any reason, and be connected to the bus, there would be a direct short-circuit through the generator. The polarized voltage relay PVR is provided to prevent this. This relay has an operating coil which is connected to the positive generator lead 22 through conductor 48, relay contact 47, switch contact 45 and conductor 44, the other end of the coil being grounded, so that it is connected across the generator voltage and the relay closes its contact only if the generator builds up with correct polarity.

When the relay PVR closes its contact, it completes an obvious circuit connecting the differential voltage coil PDR1 of the relay PDR to the feeder conductor 29. The other end of the coil PDR1 is connected directly to the generator lead 22, so that the coil responds to the difference between the generator voltage and the bus voltage and closes the contact 54 of the relay PDR when the generator voltage exceeds the bus voltage by a small predetermined amount. The contact 54 is included in the energizing circuit of the main contactor C, as explained hereinafter, and thus the relays PVR and PDR control the connection of the generator to the bus by preventing energization of the contactor C unless the generator voltage is of the correct polarity and magnitude. A holding coil PDR3 is connected in series with the contact 54 to hold the contact closed after the contactor C has closed and the voltage across the voltage coil PDR1 falls to substantially zero. It is preferred to use a differential voltage relay, as described, to control the contactor C, rather than a relay responding to a definite generator voltage because of the risk of chattering with such a relay, which may cause the generator to be connected when the bus voltage is higher than the generator voltage. If this occurs, the resulting reverse current would immediately cause the generator to be disconnected and the relay would then reconnect the generator with repeated cycles of operation and excessive chattering and wear. This possibility is avoided by using a differential voltage relay.

Under some conditions, there may be a tendency for reverse current to flow from the bus to the generator, and continued flow of reverse current can be very harmful to the generator as well as possibly causing a heavy drain on the battery. The relay PDR, therefore, includes a reverse current coil PDR2 which is connected to the generator negative terminal by the conductor 41, the other end being grounded, so that the coil PDR2 is energized by the voltage across the series field winding 18 and operates to open the contact 54 in response to reverse current, thus deenergizing the contactor C and disconnecting the generator from the bus.

In addition to the protective devices already described, protection is afforded against faults of several other types. Protection is provided against overvoltage, grounded generator leads, grounded generators, grounded feeders, and low voltage due to improper equalizer operation caused by wide generator speed differentials.

Trip-free resetting after operation of any of the protective relays is provided through a lockout circuit utilizing a relay GFR for controlling the generator field. As shown, this relay is of a type which is latched in its closed position. The relay is provided with a reset or actuating coil FRC for actuating the relay to its latched position and a trip coil FRT for actuating the tripping mechanism of the relay. After a fault occurs, it is necessary to actuate the switch RS to "off" or "reset" position to reset the field relay. With the field relay reset and the generator switch returned to the "on" position, the field circuit will be reestablished.

Generator overvoltage is caused by excessive current in the shunt field winding for speed and load conditions under which the generator is operating. The ratio of the power system capacity to battery capacity determines the amount of overvoltage which can be permitted to exist. A relay, OVR, is provided for each generator to detect overvoltage and to remove from the system any generator which is producing overvoltage and to open its field circuit. The relay is provided with an inverse time-voltage characteristic to prevent transient overvoltage causing nuisance operation.

If one generator is producing an abnormally high voltage, and thus tending to supply more than its share of current to the system, the direction of current flow in the equalizer circuit will be such as to raise the voltage of the normal generators, and operation of the overvoltage relays of one or more of the normal generators may result. The polarized selector relay OSR is provided to prevent this and to obtain the necessary selectivity to insure that only the generator which is producing overvoltage will be removed from the system.

The polarized selector relay OSR has a coil 42 which is connected across the ballast lamp BL in the equalizer circuit, so as to be energized in response to the equalizer current. If the generator 16 produces an abnormally high voltage, the direction of current flow through the ballast lamp BL is such that the contact of the relay OSR is held closed, while the corresponding relays OSR of the other generators in the system will open their contacts since the current flow in their equalizer circuits will be in the opposite direction. The coil of the overvoltage relay OVR is connected across the generator voltage, through the contact of the polarized relay OSR and the conductor 48, contacts 47 and 45 and conductor 44, so that the relay OVR closes its contact in response to overvoltage and completes an energizing circuit to the coil FRT to trip the field relay GFR. The overvoltage relays of the normal generators are prevented from operating by the open contacts of their polarized relays OSR which do not close until the generator which was producing overvoltage has been removed and normal conditions restored.

Protection against ground faults in the generator, generator leads or generator feeders, is obtained by using the voltage drop across the series winding of the generator balanced against the voltage drop of a compensating shunt 25 which is located near the bus. A fault of sufficient magnitude in the generator, or in the generator lead or generator feeder, will unbalance the shunt current with respect to the generator series winding current. This will in turn unbalance the magnetic circuit of a ground fault relay GFP, causing it to operate, thereby actuating the controls which isolate the generator, generator leads, and the feeders. A trip indicator light 53 is provided for each generator to indicate when a field relay opens the generator field circuit. The light 53 shows that the trip-free generator switch for that particular generator must be reset before operation of this unit can be resumed.

As explained hereinbefore, the field relay GFR utilized in the present system is of a latching type. The circuit is so arranged that unless a fault occurs it is not necessary for the operator to operate any of the switches. Thus the generator will build up and come on the bus automatically when the plane engine is brought up to sufficient speed and will be automatically cut off the bus when it is shut down. There are no limitations on the number of times this can be done.

The operator can cut off the generator voltage by opening the generator switch. The only time, however, that he must reset the system is following a fault. By the term "fault" is meant a condition that will operate the ground fault protection relay or the overvoltage relay.

The system is "trip-free"; that is, it will operate once and require a reset operation before the generator can again be connected to the bus. Thus, it will not "chatter" or "pump." The number of times the system is tried under a fault condition is at the discretion of the operator. Resetting can be accomplished electrically by placing the generator switch in the "off" position or manually by manually actuating the relay GFR to its closed position.

Paralleling a generator with the battery or other generators is accomplished through action of the polarized voltage relay PVR and the field relay GFR. The field relay closes the generator field circuit and allows the generator to build up voltage. The polarized voltage relay PVR will close when the generator voltage builds up to a predetermined voltage of correct polarity. Operation of the polarized voltage relay completes the circuit through the polarized differential relay coil PDR1 from the generator to bus. The polarized differential relay PDR closes only when the generator voltage is higher than the bus voltage by a predetermined amount or more. Under normal operating conditions this completes the paralleling operation.

As explained hereinbefore, the equalizer disconnect relays EDR of the system function to control the connection of the paralleling coils 34 of the voltage regulators to the equalizer bus 39. The actuating coil of the relay EDR is connected between ground and the positive generator conductor 22 through a circuit which extends from ground through the coil of the relay EDR, contact members 54 of the relay PDR, conductor 42, contact members 47 of the relay GFR, conductor 46, contact members 45 of the switch RS and conductor 44 to the positive conductor 22. Thus, the coil of the relay EDR is energized by the generator voltage to close its contact members 43, and the relay is automatically opened when the generator is shut down by the operation of the field relay GFR.

The operation of the system may be described briefly as follows. Assuming that the switch 15 is closed to connect the battery 14 to the main bus 12 or that another unit is already operating to supply power to the main bus, the prime mover for the generator 16 may be started by utilizing the generator 16 as a motor to start the prime mover 17. The prime mover may be started by closing a starting switch SS, thereby energizing the coils of a starting relay SR and an interlocking relay IR through the contact members of a starting disconnect relay SDR.

The relay IR is closed to energize the coil of the contactor C through a circuit which extends from the main bus 12 through conductors 29 and 55, the switch SS, conductor 56, contact members 57 of the relay IR and the actuating coil of the contactor C to ground. The starting relay SR is closed to connect the starting winding 21 of the dynamo-electric machine 16 to the main bus 12, thereby causing the machine to function as a motor to start the prime mover 17.

The circuit for the dynamo-electric machine 16 extends from the main bus 12 through the conductor 29, the series coil 28 of the relay UCR, contact members 27 of the contactor C, conductor 26, the shunt 25, conductor 24, contact members 58 of the starting relay SR, the field winding 21, the armature winding of the machine 16 and the series field winding 18 to ground at 13.

At this time, the contact members of the undercurrent relay UCR are closed to shunt the switch SS, thereby maintaining the coils of the relays IR and SR energized after the switch SS is opened. The contact members of the relay UCR are opened upon a decrease in the starting current as the prime mover starts operation, thereby dropping out the starting relay SR, the contactor C and the interlocking relay IR. The generator is now ready to be connected to the bus 12 which may be done by closing the generator switch GS. If the prime mover fails to start, for any reason, the relay UCR will not drop out, but repeated cranking may be prevented by closing a starting disconnect switch SDS to energize the relay SDR, thereby opening its contact members to deenergize the starting relay SR and the interlocking relay IR.

Upon the closing of the switch GS, the coil of the generator transfer relay GTR is energized through a circuit which extends from the positive conductor 22 through conductor 44, contact members 45 of the switch RS, conductor 46, contact members 47 of the relay GFR, conductor 48, contact members 59 of the switch GS, conductor 61, contact members 62 of the interlocking relay IR, conductor 63 and the coil of the relay GTR to ground. The transfer relay GTR therefore closes its contact 23 to connect the machine 16 to the contactor C for operation as a generator.

As explained hereinbefore, the relay PDR will close its contact members after the closing of the contact members of the relay PVR when the generator voltage is of the correct polarity and magnitude. The closing of the contact members of the relay PDR establishes an energizing circuit for the coil of the contactor C which extends from the conductor 48 through contact members 54 of the relay PDR, the coil PDR3, conductor 64, contact members 65 of the switch GS, conductor 66, contact member 67 of the relay IR and the actuating coil of the contactor C to ground. The closing the transfer relay GTR and the contactor C connects the generator 16 to the main bus 12 through a circuit previously traced.

As explained hereinbefore, the field relay GFR is tripped upon the occurrence of either an overvoltage condition which causes the operation of the relay OVR or a fault in the generator or feeder circuits which cause the operation of the differential relay GFP. When this occurs, the field relay GFR functions not only to interrupt the control circuit for the line switch C but also to interrupt the energizing circuit for the generator field winding 19. This not only disconnects the generator from the bus but also reduces its voltage to near zero. The generator cannot be reconnected until after the field relay GFR has been reset by operating the switch RS in the manner previously described.

In the modification of the invention illustrated in Fig. 2, in which like parts are designated by the same reference characters as in Fig. 1, a relay OSR1 is provided with a contact member 68 which is normally biased to its mid-position by springs 69. When the contact member 68 is actuated in one direction a resistor 71 is connected in parallel-circuit relation to the coil of the relay OVR. When the contact member 68 is actuated in the other direction, a resistor or rheostat 72 is short-circuited from the circuit for the coil of the relay IVR.

As explained hereinbefore, multi-generator direct-current electrical systems having overvoltage protection require some means for selecting and disconnecting from the system the particular generator which is causing overvoltage, while leaving the normal generators connected to the system. One objection to prior selectivity schemes is that frequently generators operating at a normal voltage are disconnected from the system because if one generator is producing abnormally high voltage, the bus voltage is raised and causes reverse current to flow through the normal generators. Another objection is that on a system supplying a heavy load, a generator which is tending to produce an abnormally high voltage will take an excessively large percent of the system load without raising its voltage enough to operate the overvoltage relay. Consequently, the fault may remain on the system undetected for a sufficient time to burn out the highly overloaded generator.

The present system overcomes the foregoing objections by utilizing the polarized relay OSR1 and the resistors 71 and 72 in conjunction with the overvoltage relay OVR. The relay OSR1 is so connected that it is responsive to the equalizer current and its contact members change the connections for the resistors 71 and 72 to raise or lower the operating voltage of the relay OVR.

Assume that the voltage of the generator 16 for unit 10 rises above the normal voltage, for any reason, and that the system is supplying a heavy load. The system voltage will rise slightly, but not high enough to operate the relay OVR for unit 10. Current will flow in the equalizer circuit including the equalizer bus 39 from all the other generators in the system to generator 16. The coil of the relay OSR1 will be energized with such polarity that its contact member 68 is actuated to short circuit the resistor 72. This action reduces the voltage at which the relay OVR for unit 10 will operate, thus disconnecting the generator 16 from the system through action of the field relay GFR.

The relays OSR1 of the other generators connected to the bus will actuate their contact members in the opposite direction since the equalizer currents of these generators will flow in the opposite direction from the equalizer current of the generator 16. The relays OSR1 of the other generators, therefore, will operate to shunt the coils of the respective relay OVR with the resistors 71, reducing the currents in the relay coils and preventing operation of the relays OVR of the normal generators. Thus, the relays OSR1 operate to, in effect, change the settings of the relays OVR to cause the generator which is producing overvoltage to be disconnected and to prevent disconnection of the normal generators.

From the foregoing description, it is apparent that we have provided an auxiliary power system which is suitable for utilization on aircraft and particularly planes which are driven by prime movers of the internal combustion or jet engine types which may be started by utilizing the dynamo-electric machine normally driven by the prime mover as a means for cranking the prime mover. The system provides for parallel operation of a plurality of generators and affords protection against faults in the generators or their connections, and also protects against overvoltage and reverse current conditions.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In combination, a plurality of dynamo-electric machines operable either as motors or generators disposed to be connected in driving relation with prime movers requiring cranking, said machines having a plurality of field windings including series and starting field windings, and circuit means connecting each machine to a common load bus including main, starting and transfer contactors, said starting contactors being effective when closed in conjunction with the main contactors to connect their machines to the load bus through their starting and series field windings, said transfer contactors being effective when closed in conjunction with the main contactors to connect the machines to the load bus through the series field winding only.

2. In combination, a plurality of dynamo-electric machines operable either as motors or generators disposed to be connected in driving relation with prime movers requiring cranking, said machines having a plurality of field windings including series and starting field windings, and circuit means connecting each machine to a common load bus including main, starting and transfer contactors, said starting contactors being effective when closed in conjunction with the main contactors to connect their machines to the load bus through their starting and series field windings, said transfer contactors being effective when closed in conjunction with the main contactors to connect the machines to the load bus through the series field winding only, control circuit means including a starting switch individual to each machine operable to control the operation of said contactors to initially effect the closure of the main and starting contactors only to connect the machines to the load bus as starting motors and finally operable to effect the opening of said contactors in response to the starting of the prime movers.

3. In combination, a direct current dynamo-electric machine for supplying power to a load bus, said machine having a plurality of field windings, electrically operated switch means for connecting the machine to the load bus through different combinations of field windings to operate the machine either as a starting motor for its prime mover or as a generator supplying power to the load bus, a voltage regulator for controlling the excitation of one of said field windings, circuit means including a field relay for controlling the energization of the field winding and the electrically-operated switch means, and relay means operable to control the operation of the field relay to effect the opening of the field circuit and the electrically-operated switch means in response to a fault in the machine.

4. In combination, a direct current dynamo-electric machine for supplying power to an energized load bus, electrically-operated switch means operable to connect the machine to the load bus, said switch means including main, starting and transfer contactors, said main and starting contactors being effective when closed to connect the machine as a motor and said main and transfer contactors being effective when closed to connect the machine as a generator, and control circuit means initially operable to effect closure and subsequent opening of the main and starting contactors and thereafter the closure of the main and transfer contactors.

5. In combination, a direct current dynamo-electric machine for supplying power to an energized load bus, electrically-operated switch means operable to connect the machine to the load bus, said switch means including main, starting and transfer contactors, said main and starting contactors being effective when closed to connect the machine as a motor only with the transfer contactor open and said main and transfer contactors being effective when closed to connect the machine as a generator only with the starting contactor open, control circuit means operable to effect closure of the main and starting contactors and to render the transfer contactor ineffective, said control circuit means including a manually operable starting switch and relay means operable to effect the opening of the main and starting contactors in response to a predetermined reduction in motor current, and additional control circuit means operable to effect closure of the main and transfer relays and to render the starting contactor ineffective, said additional control circuit means including a manually-operable generator switch and relay means effective to render said additional control circuit means effective only in the event that the polarity and magnitude of voltage of the generator is in predetermined relation to the polarity and magnitude of voltage of the load bus.

6. In combination, a plurality of direct current dynamo-electric machines for supplying power to a common energized load bus, said machines being operable as generators or as starting motors for prime movers disposed in driving relation therewith, each machine having a shunt field winding, electrically-interconnected voltage regulators individual to each machine for normally controlling the voltages and load division therebetween when operating as generators, a plurality of electrically-operated contactors individual to each machine operable in different combinations for connecting the machines to the load bus either as starting motors for their associated prime movers or as generators, control circuit means individual to each machine for selectively controlling the operation of said contactors, means including a field relay individual to each machine for controlling the energization of certain of said control circuits and the field winding operable in response to the occurrence of a fault in the machines when operating as generators or in their connecting conductors to effect the deenergization of said certain control circuits and field windings.

7. In combination, a dynamo-electric machine adapted to function either as a direct current generator to supply power to an energized load bus or as a motor receiving power therefrom, said machine having a plurality of field windings including a series field winding and a starting field winding, main circuit means connecting the machine to the load bus, said circuit means including a main switch and a transfer switch effective when closed to connect the machine including its series field winding to the load bus as a generator, and additional circuit means including the starting field winding and a starting switch connected to the main circuit means in shunt relation with the transfer switch effective when closed in conjunction with the main switch to connect the machine to the load bus as a motor.

8. In combination, a dynamo-electric machine adapted to function either as a direct current generator to supply poyer to an energized load bus or as a motor receiving power therefrom, main circuit means connecting the machine to the load bus, said circuit means including a main switch and a transfer switch effective when closed to connect the machine as a generator, and a starter switch effective when closed in conjunction with the main switch to connect the machine as a motor.

9. In combination, a dynamo-electric machine operable either as a motor or a generator and adapted to be connected in driving relation with a prime mover, said machine having a plurality of field windings including series and starting field windings, and circuit means connecting the machine to a load bus including main, starting and transfer contactors, said starting contactor being effective when closed in conjunction with the main contactor to connect the machine to the load bus through the starting and series field windings, said transfer contactor being effective when closed in conjunction with the main contactor to connect the machine to the load bus through the series field winding only.

10. In combination, a dynamo-electric machine operable either as a motor or a generator and adapted to be connected in driving relation with a prime mover, said machine having a plurality of field windings including series and starting field windings, and circuit means connecting the machine to a load bus including main, starting and transfer contactors, said starting contactor being effective when closed in conjunction with the main contactor to connect the machine to the load bus through the starting and series field windings, said transfer contactor being effective when closed in conjunction with the main contactor to connect the machine to the load bus through the series field winding only, and control circuit means including a starting switch operable to control the operation of said contactors to initially effect the closure of the main and starting contactors only to connect the machine to the load bus as a starting motor and finally operable to effect the opening of said contactors in response to the starting of the prime mover.

11. In combination, a direct-current dynamo-electric machine having a shunt field winding, a series field winding and a starting field winding, said machine being adapted for connection to a load bus either as a motor for starting its prime mover or as a generator supplying power to the load bus, switching means for effecting connection of the machine to the load bus, said switching means including main, starting and transfer contactors, a starting switch for effecting closure of the main and starting contactors to connect the machine to the bus through the starting and series field windings for operation as a motor, means for effecting opening of the main and starting contactors in response to a predetermined decrease in motor current, and means for thereafter effecting closure of the main and transfer contactors to connect the machine to the bus through the series field winding only for operation as a generator.

12. In combination, a direct-current dynamo-electric machine having a shunt field winding, a series field winding and a starting field winding, said machine being adapted for connection to a load bus either as a motor for starting its prime mover or as a generator supplying power to the load bus, switching means for effecting connection of the machine to the load bus, said switching means including main, starting and transfer contactors, a starting switch for effecting closure of the main and starting contactors to connect the machine to the bus through the starting and series field windings for operation as a motor, means for effecting opening of the main and starting contactors in response to a predetermined decrease in motor current, and control circuit means for thereafter connecting the machine to the bus for operation as a generator, said control circuit means including relay means for effecting closure of the main and transfer contactors to connect the machine to the bus through the series field winding only in response to the voltage of the machine exceeding the bus voltage by a predetermined amount.

BASCUM O. AUSTIN,
RALPH D. JESSEE.
CLARE A. STUMP, Jr.

References Cited in the file of this patent

UNITED STATES PATENTS

| Number | Name | Date |
|---|---|---|
| 742,886 | Maxim | Nov. 3, 1903 |
| 1,109,235 | Laycock | Sept. 1, 1914 |
| 1,164,035 | Tobiessen | Dec. 14, 1915 |
| 1,347,546 | Larsh | July 27, 1920 |
| 1,362,380 | Woolson | Dec. 14, 1920 |
| 1,363,302 | Zimmerman et al. | Dec. 28, 1920 |
| 1,415,309 | Byles | May 9, 1922 |
| 1,610,634 | Thau | Dec. 14, 1926 |
| 1,635,574 | Carey | July 12, 1927 |
| 1,658,254 | Radley | Feb. 7, 1928 |
| 1,661,208 | Witzel | Mar. 6, 1928 |
| 1,672,112 | Brotz | June 5, 1928 |
| 1,794,392 | Witzel | Mar. 3, 1931 |
| 1,795,053 | Strong | Mar. 3, 1931 |
| 1,796,810 | Schmidt et al. | Mar. 17, 1931 |
| 1,808,543 | Gittings et al. | June 2, 1931 |
| 1,851,989 | Seeger | Apr. 5, 1932 |
| 1,873,168 | Wendt | Aug. 23, 1932 |
| 1,873,169 | Wendt | Aug. 23, 1932 |
| 1,905,240 | Peterson | Apr. 25, 1933 |
| 1,928,189 | Swint | Sept. 26, 1933 |
| 2,012,425 | Gemmell | Aug. 27, 1935 |
| 2,132,768 | Gil | Oct. 11, 1938 |
| 2,186,217 | Spencer | Jan. 9, 1940 |
| 2,494,347 | Lusk | Jan. 10, 1950 |
| 2,564,785 | Kueppers | Aug. 21, 1951 |

FOREIGN PATENTS

| Number | Country | Date |
|---|---|---|
| 734,478 | France | Aug. 1, 1932 |